US012442491B2

(12) United States Patent
Briglia et al.

(10) Patent No.: US 12,442,491 B2
(45) Date of Patent: Oct. 14, 2025

(54) PROCESS AND APPARATUS FOR ESTABLISHING VACUUM INSULATION UNDER CRYOGENIC CONDITION (71) Applicant: L'Air Liquide, Societe Anonyme pour l'Etude et l'Exploitation des Procedes Georges Claude, Paris (FR)

(72) Inventors: Alain Briglia, Zhejiang (CN); Vincent Gueret, Zhejiang (CN); Ren Chen, Zhejiang (CN)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 1413 days.

(21) Appl. No.: 16/474,102

(22) PCT Filed: Dec. 29, 2016

(86) PCT No.: PCT/CN2016/112920
§ 371 (c)(1),
(2) Date: Jun. 27, 2019

(87) PCT Pub. No.: WO2018/119831
PCT Pub. Date: Jul. 5, 2018

(65) Prior Publication Data
US 2020/0248872 A1    Aug. 6, 2020

(51) Int. Cl.
F17C 13/00 (2006.01)
F25J 3/04 (2006.01)
F25J 3/06 (2006.01)

(52) U.S. Cl.
CPC ......... F17C 13/001 (2013.01); F25J 3/04945 (2013.01); F25J 3/0695 (2013.01);
(Continued)

(58) Field of Classification Search
CPC .............. F17C 13/001; F17C 13/04945; F17C 3/0695; F17C 2203/0602;
(Continued)

(56) References Cited

U.S. PATENT DOCUMENTS 3,092,283 A * 6/1963 Trepp ................... F17C 13/001
220/23.88
3,111,074 A * 11/1963 Kennard, Jr. ............ B01J 3/006
220/592.27

(Continued)

FOREIGN PATENT DOCUMENTS

CA    2852451 A1 * 11/2015    ................ F17C 3/08
CN    101 072 969    11/2007
(Continued)

OTHER PUBLICATIONS

International Search Report and Written Report for PCT/CN2016/112920, mailed Sep. 28, 2017.
(Continued)

Primary Examiner — Jianying C Atkisson
Assistant Examiner — Ibrahim A. Michael Adeniji
(74) Attorney, Agent, or Firm — Justin K. Murray (57) ABSTRACT A process for establishing vacuum insulation under cryogenic condition and an apparatus compatible with such process are described. When an insulation enclosure filled with high purity $CO_2$ is evacuated to around 100 absolute Pa at ambient temperature, hard vacuum of below 1 absolute Pa may be automatically obtained within the insulation enclosure when temperature drops to around or below $-170°$ C. This process can be employed to provide vacuum insulation for cold box housing air separation units operated under cryogenic condition.

34 Claims, 3 Drawing Sheets (52) U.S. Cl.
CPC ............... *F17C 2203/0391* (2013.01); *F17C 2223/0161* (2013.01); *F25J 2290/30* (2013.01); *F25J 2290/42* (2013.01)

(58) Field of Classification Search
CPC ...... F17C 2203/0604; F17C 2203/0607; F17C 2203/0612; F17C 2203/0626; F17C 2203/0629; F17C 2203/0631; F17C 2203/0391; F17C 2203/03; F17C 3/08; F17C 2223/0161; F25J 3/0695; F25J 2290/30; F25J 2290/42; F25J 3/04945; F25J 3/0295; F25J 1/0261; F25J 3/04; B01D 8/00; F04B 37/08; F04B 37/085
USPC ................. 65/55.5; 62/55.5; 220/592.27
See application file for complete search history.

(56) References Cited

U.S. PATENT DOCUMENTS

| | | | | |
|---|---|---|---|---|
| 3,439,870 | A * | 4/1969 | Helmut | H01J 7/18 |
| | | | | 417/51 |
| 3,547,161 | A | 12/1970 | Reece et al. | |
| 3,812,886 | A | 5/1974 | Hallwood | |
| 4,017,284 | A | 4/1977 | Gifford | |
| 4,662,921 | A * | 5/1987 | Dean | F17C 13/001 |
| | | | | 220/88.3 |
| 4,680,935 | A * | 7/1987 | Murai | F17C 3/08 |
| | | | | 220/592.27 |
| 4,726,974 | A | 2/1988 | Nowobilski et al. | |
| 4,938,667 | A * | 7/1990 | della Porta | C22C 16/00 |
| | | | | 417/51 |
| 5,205,042 | A * | 4/1993 | Greter | B01D 3/32 |
| | | | | 33/291 |
| 5,617,742 | A * | 4/1997 | Toppel | F25J 3/0489 |
| | | | | 62/643 |
| 5,879,467 | A * | 3/1999 | Zhou | C23C 16/4412 |
| | | | | 134/21 |
| 7,854,236 | B2 | 12/2010 | Jibb et al. | |
| 2005/0204752 | A1 * | 9/2005 | Sar | F17C 3/08 |
| | | | | 62/55.5 |
| 2006/0054234 | A1 * | 3/2006 | White | F16L 59/141 |
| | | | | 138/148 |
| 2006/0086141 | A1 * | 4/2006 | Cote | F25J 3/04412 |
| | | | | 62/643 |
| 2006/0144684 | A1 * | 7/2006 | Gibbon | F25J 3/04945 |
| | | | | 202/133 |
| 2007/0220904 | A1 * | 9/2007 | Jibb | F16L 59/065 |
| | | | | 62/50.7 |
| 2008/0314455 | A1 | 12/2008 | Jibb et al. | |
| 2020/0370826 | A1 * | 11/2020 | Butler | F17C 13/001 |
| 2022/0026024 | A1 * | 1/2022 | Beuneken | F17C 5/02 |

FOREIGN PATENT DOCUMENTS

| | | | |
|---|---|---|---|
| CN | 101 688 632 | | 3/2010 |
| CN | 2019 34814 | | 8/2011 |
| DE | 102 59 555 | | 7/2004 |
| EP | 0 412 715 | | 2/1991 |
| EP | 538857 | A1 * | 4/1993 ........... F25J 3/04254 |
| EP | 0 771 995 | | 5/1997 |
| EP | 1015827 | B2 * | 7/2007 ........... F25J 3/04254 |
| JP | 2008 144929 | | 6/2008 |
| JP | 2010 276 173 | | 12/2010 |
| JP | 49 058 451 | | 6/2012 |
| KR | 2010 0097936 | | 9/2010 |
| NL | 6902504 | | 8/1969 |

OTHER PUBLICATIONS

EP Supplementary EP Search Report and Written Opinion for EP16925226, mailed Jun. 24, 2020.

* cited by examiner

PROCESS AND APPARATUS FOR ESTABLISHING VACUUM INSULATION UNDER CRYOGENIC CONDITION

CROSS REFERENCE TO RELATED APPLICATIONS

This application is a § 371 of International PCT Application PCT/CN2016/112920, filed Dec. 29, 2016, which is herein incorporated by reference in its entirety.

FIELD OF THE INVENTION

The present invention relates to a process of establishing vacuum insulation for cryogenic equipment and an apparatus compatible with such process.

BACKGROUND OF THE INVENTION

Cryogenic processes, such as cryogenic air separation and HYCO processes, often operate at temperatures below approximately −90° C. Such processes require insulation around the process equipment and interconnecting piping from surrounding environment to prevent excessive heat leak into the process and water freezing around the equipment.

Common insulation methods for reducing heat transfer from the surrounding environment include the use of perlite, mineral wool and vacuum. Perlite and mineral wool have low heat conductivity and can be filled into a vessel housing the cryogenic equipment. Nitrogen purge is often required to remove moisture, oil or other flammable or corrosive components from the vessel.

With vacuum insulation, the equipment is placed within a vessel and a vacuum is pulled on the annular space between the equipment and the vessel wall, which reduces heat transfer by conduction and convection. Vacuum insulation can provide more resistance to heat transfer and is preferred for processes operated below −150° C. in compact vessels. However, an adequate vacuum is difficult and costly to produce at ambient temperature. Additional insulation materials, such as perlite, mineral wools, aerogel or polymeric foams used for creating and maintaining the vacuum insulation further increase cost.

SUMMARY OF THE INVENTION

An object of the present invention is to avoid the time-consuming and costly process of creating a vacuum level harder than 5 absolute Pa at ambient temperature in insulation enclosure housing cryogenic equipment; a further object is to eliminate the use of insulation materials inside the insulation enclosure.

In one embodiment, a process for establishing an insulation enclosure is described. Such process comprises the following steps. For an insulation enclosure having a casing encompassing a cryogenic equipment, a filling gas of a desired purity is provided; perform at least a first purging cycle to the insulation enclosure, which is characterized by evacuating the insulation enclosure from a first starting pressure to an intermediate vacuum, followed by re-pressuring the insulation enclosure with the filling gas back to a second starting pressure equal to or different from the first starting pressure; creating and maintaining a primary vacuum in the insulation enclosure filled mostly with the filling gas; operating the cryogenic equipment to cool the insulation enclosure and the filling gas to a temperature equal to or below that solidifies the filling gas, thus creating a final vacuum in the insulation enclosure; wherein starting from the primary vacuum, the filling gas undergoes transformation from gas phase to solid phase without going through liquid phase during the cooling caused by operation of the cryogenic equipment.

The above process may further comprise a second and a third purging cycle with the filling gas following the first purging cycle, wherein in the second purging cycle, the insulation enclosure is evacuated from the second starting pressure until a second intermediate vacuum and pressurized back to a third starting pressure, and in the third purging cycle, the insulation enclosure is evacuated from the third starting pressure until a third intermediate vacuum and pressurized back to a fourth starting pressure.

In the present disclosure, the first, second, third and fourth starting pressure of their respective purging cycles may be the same or different. Likewise, the first, second and third intermediate vacuum of their respective purging cycles may be the same or different.

The starting pressure of any of the purging cycles may be at atmospheric pressure or above atmospheric pressure. When the first starting pressure is above atmospheric pressure, the insulation enclosure may be pressurized with the filling gas to reach the first starting pressure.

The filling gas may be carbon dioxide with a purity of equal to or better than 99.99% volume percentage.

In another embodiment, an insulation enclosure for a cryogenic equipment is disclosed. The insulation enclosure comprises a casing encompassing the cryogenic equipment, which is filled mostly with a filling gas of a desired purity. The insulation enclosure is evacuated to and maintained at a primary vacuum and a final vacuum is achieved in the insulation enclosure after the filling gas is solidified due to the operation of the cryogenic equipment, wherein starting from the primary vacuum, the filling gas undergoes transformation from gas phase to solid phase without going through liquid phase during the cooling of the insulation enclosure caused by the operation of the cryogenic equipment.

With the present disclosure, it is not necessary to create a hard vacuum inside the insulation enclosure, for example 1 absolute Pascal (1 Pa) at ambient temperature through pumping; instead, only soft vacuum around 100 Pa needs to be established before operation of cryogenic equipment. This eliminates the use of costly pumps such as turbo molecular pumps as well as reduces pumping time from several weeks to a couple hours.

By filling the insulation enclosure with a filling gas of desired property and purity, a hard vacuum of lower than 1 absolute Pa can be achieved automatically, further reduces cost, time and labor.

DETAILED DESCRIPTION OF THE INVENTION

Cryogenic processes refer to processes carried out at low temperature, usually below −90° C., in some cases below −150° C. To prevent excessive energy loss to ambient surroundings during cryogenic process, insulation around cryogenic equipment and interconnecting pipes are necessary; and the lower the operation temperature, the more insulation is required. In the case of vacuum insulation, a vacuum of below 5 absolute Pascal is required for cryogenic equipment operated around −170° C. and a vacuum of below 1 absolute Pascal is required if the cryogenic equipment is operated around −190° C.

Cryogenic equipment comprises rectification apparatus used in cryogenic air separation to produce oxygen, nitrogen, argon or other pure components of air. Cold boxes or cylindrical-shaped containers correspond to the insulation enclosure housing the cryogenic equipment. The casing of such insulation enclosure may be made of carbon steel to provide strong structural support and withstand the vacuum created within. Conventionally, to create a vacuum level of 1 Pa for a vacuum-tight space of 50 m$^3$, about 3 weeks of pumping time is needed with one turbo molecular pump.

Figure 1:
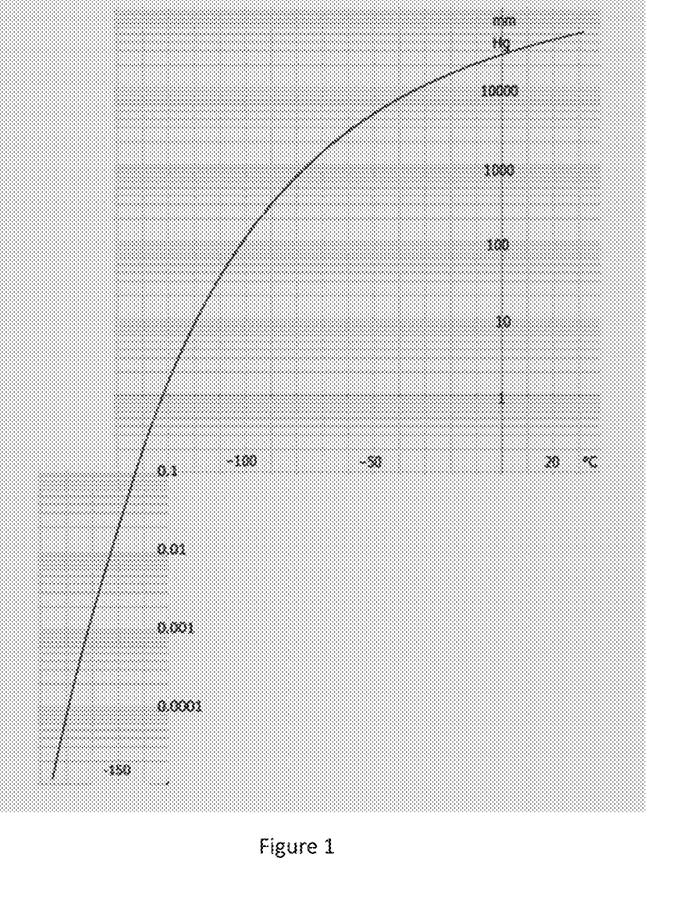
FIG. 1 illustrates the vapor pressure of carbon dioxide at different temperature.

This invention discloses a method utilizing the physical property of certain gases to create adequate vacuum under cryogenic condition without extensive pumping. When a gaseous component condenses into liquid or solid phase in a closed system, the pressure attributed to such component within the closed system equals to the vapor pressure of the liquid or solid, which decreases non-linearly with the drop of temperature. FIG. 1 presents a vapor pressure (mmHg) vs. temperature (° C.) graph for carbon dioxide, and for a temperature of −170° C., the vapor pressure of pure carbon dioxide is 0.013 absolute Pascal.

When an insulation enclosure, such as a cold box is filled with a pure filling gas such as $CO_2$, the gas in contact with the cryogenic equipment becomes cold and condenses into solid phase due to the refrigeration produced during the cryogenic process. Once the gas is solidified, its vapor pressure further decreases with the drop of temperature, thus hard vacuum can be established automatically within the cold box.

Figure 2:
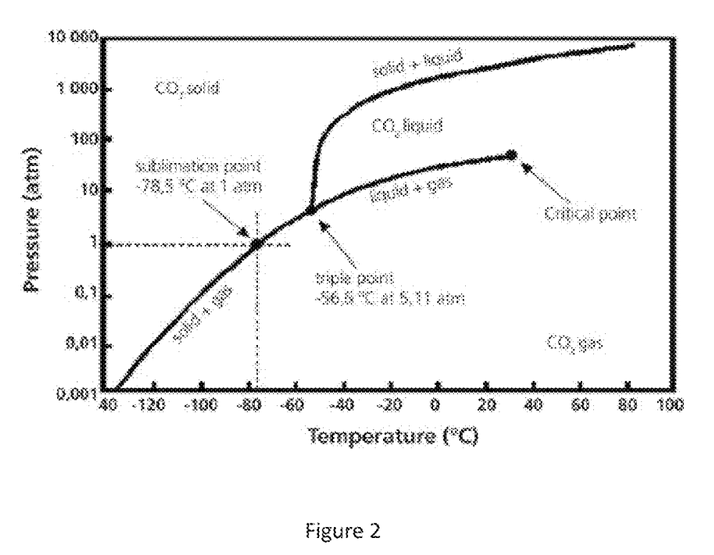
FIG. 2 presents the phase diagram of carbon dioxide.

For practical consideration, the preferable filling gas is non-toxic, non-flammable, non-corrosive, relatively inexpensive and available. Additionally, the filling gas shall transform from gas phase to solid phase directly during the cryogenic process. This property of selected gas can be accessed using its phase diagram. A phase diagram is a graphical representation showing conditions (pressure, temperature, volume, etc.) at which thermodynamically distinct phases occur and coexist at equilibrium. FIG. 2 illustrates the phase diagram of carbon dioxide. Since the triple point of carbon dioxide is at 5.11 atm and −56.6° C., for pressure at or below atmospheric pressure, carbon dioxide transforms from gas phase to solid phase without passing through liquid phase when temperature drops. Thus, carbon dioxide is a good candidate as a filling gas for this invention. Other gases that condense from gas phase into solid phase directly at pressure equal or below atmospheric pressure include water, $H_2S$, $SO_2$, $NH_3$, but they do not possess the other advantages as $CO_2$ does.

However, in reality, industrial-scale pure gas is not available. Even 99.995 volume percent $CO_2$ consists of trace amount of $H_2O$, $N_2$ and other impurities, which negatively impact the vacuum level achievable at low temperature. The present invention provides practical solution to obtain adequate vacuum insulation for cryogenic processes, in particular those operated around or below −170° C., taking into consideration of material availability, cost, energy and time consumed.

When carbon dioxide is selected as the filling gas, depending on the final vacuum required in the cold box, carbon dioxide of various degree of purity may be used. It is recommended to use a carbon dioxide gas with a purity of better than 99.99% volume percent for a final vacuum of lower than 1 absolute Pascal at −170° C.

Air inside the cold box needs to be replaced with high-purity carbon dioxide, which is accomplished through carbon dioxide purging. A purging cycle consists of the following steps: connect a pump and a carbon dioxide source to the insulation enclosure, for example, a cold box; at a starting pressure, shut off the carbon dioxide source and turn on the pump; remove the gaseous component inside the cold box until its pressure drops to a pre-determined intermediate vacuum; turn off the pump and fill the cold box with carbon dioxide until the pressure reaches a pre-determined starting pressure for the next purging cycle or pumping step. More than one purging cycle, preferably three purging cycles may be performed to effectively replace air originally inside the cold box with the filling gas.

The starting pressure of the first purging cycle may be atmospheric pressure or a pressure above. To obtain a starting pressure above the atmospheric pressure, the insulation enclosure can be pressurized with air or the filling gas carbon dioxide. Respective starting pressure of the following purging cycles can be the same as the first starting pressure, or different. Likewise, the intermediate vacuum of each purging cycle can be the same.

Assuming the starting pressure X of each purging cycle is 100 KPa and the intermediate vacuum of each purging cycle Y is 1000 Pa, then after one purging cycle, the volume percentage of remaining air is:

$$(Y/X) \times 100\% = (1/100) \times 100\% = 1\%$$

After n times of purging cycle, the volume percentage of remaining air is:

$$(Y/X)^n \times 100\%$$

When n equals to 3, the volume percentage of remaining air is:

$$(Y/X)^3 \times 100\% = (1/100)^3 \times 100\% = 0.0001\%$$

At this low level, the impact of remaining air on the final vacuum is negligible.

After three purging cycles, the cold box is then filled mostly with carbon dioxide of a selected purity and is at a fourth starting pressure. A final pumping step is carried out to remove carbon dioxide until the pressure inside the cold box reaches a pre-determined primary vacuum followed by sealing the cold box. The primary vacuum may be harder, softer or equal to the intermediate vacuum. All the purging and pumping steps can be performed in shop and the sealed cold box is then ready to be transported to different sites. Once on site, final vacuum will be established when cryogenic process starts and the temperature inside the cold box decreases.

The value of primary vacuum is determined taking into account the following factors. In one aspect, to maintain final vacuum at cryogenic temperature consumes refrigeration energy from the cryogenic process; thus with a low primary vacuum, less refrigeration energy is needed and the efficiency of the cryogenic equipment is improved. In another aspect, to create a very low primary vacuum demands the use of expensive pumps such as turbo molecular pumps and requires a substantial amount of pumping time. To balance time, cost and energy-saving, it is recommended to select a primary vacuum level that approaches the best vacuum level readily attainable using a mechanical pump, for instance, around 100 Pa.

Insulation materials such as perlite, mineral wool and gel, including aerogel, can be filled into the insulation enclosure before purging with the filling gas to further reduce heat leak into the cryogenic process. Since vacuum insulation created through the present invention is very efficient, it is not necessary to employ the above insulation materials for maintaining a vacuum under 1 absolute Pa at or below −150° C.

Generally speaking, at pressure below 100 absolute Pa, conductive or convective heat transfer is effectively eliminated. Radiated heat transfer from high temperature component, such as the casing of the insulation enclosure, to low temperature component, such as the cryogenic equipment, still needs to be controlled through the use of thermal radiation shields.

Thermal radiation shields typically take the form of radiation shielding sheets or radiation shielding coating. Radiation shielding sheets are commonly thin layers made of good thermal conductors including copper and aluminum. They can be arranged as single layer or spaced-multi layers surrounding, but not directly touching the low temperature component. For instance, the radiation shielding sheet shall completely surround the cryogenic equipment without gaps or holes, or they can contact and cover the entire inner surface of the casing encompassing the cryogenic equipment.

Radiation shielding coating usually consists of materials with high emissivity. The emissivity of an object is defined as the ratio of radiant energy emitted by that object divided by the radiant energy which a blackbody would emit at the same temperature. Thus, coating with a high emissivity on high temperature component causes more radiation from the high temperature component to be absorbed, and less radiation is reflected onto the low temperature component. In the present disclosure, radiation shielding coating may be disposed on the inner surface of the casing. Choices of suitable coating may comprise emissive substances, which also have low outgassing properties, such as paint, amythrocite, polytetrafluoroethylene, oxide or glass adapted to absorb radiation.

The following examples further illustrate the present invention, but they should not be construed as in any way limiting its scope.

Figure 3:
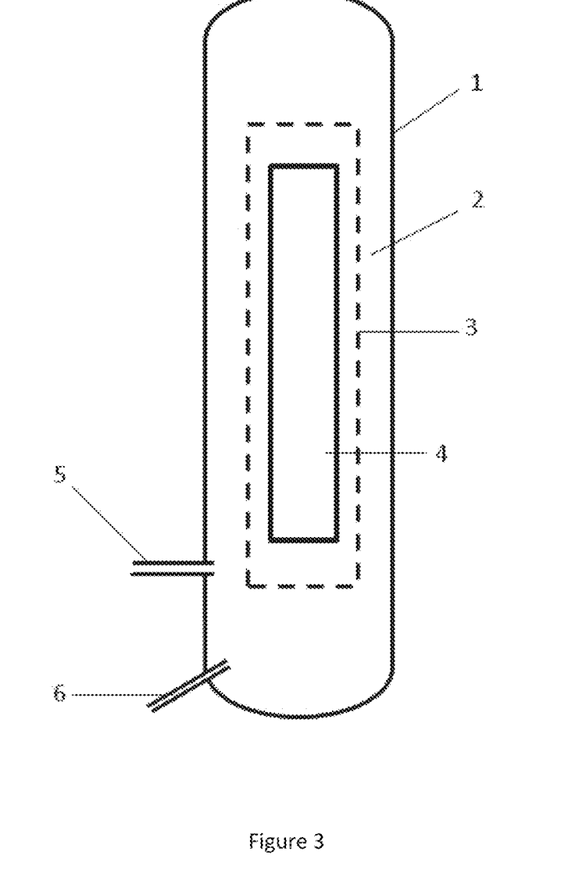
FIG. 3 presents a schematic diagram of an insulation enclosure of the present invention.

A set of experimental parameters are explored to determine the best practical condition for achieving adequate vacuum at the normal operation temperature of −170° C. for insulation enclosure depicted in FIG. 3. In this simplified schematic diagram, cryogenic equipment 4 is surrounded by a radiation shielding sheet 3, both are housed in the insulation enclosure 1. Inlet 5 may be used to fill the insulation enclosure 1 with $CO_2$, and vacuum pump may be connected to the insulation enclosure 1 through port 6 to create vacuum insulation 2. All calculations are based on a hypothetical process and are conducted using well-established mathematic and thermodynamic equations.

Firstly, the effect of the purity of the selected filling gas —$CO_2$ is studied. A series of hypothetical experiments are designed as following. After first pressurizing the cold box with $CO_2$ of respective purity from atmospheric pressure to 110000 absolute Pa, which is defined as the first starting pressure, the V % of $CO_2$ and remaining impurity in the cold box are calculated and listed in the column of Table 1 labeled as "at start". The cold box is then evacuated until the pressure drops to 1000 absolute Pa, the so-called first intermediate vacuum. Afterwards, the cold box is filled again with $CO_2$ of respective purity until the pressure within the cold box reaches the second starting pressure of 110000 absolute Pa. At this moment, the first purging cycle is completed, and the V % of $CO_2$ and remaining impurity in the cold box are calculated and listed in the column of Table 1 labeled as "after $1^{st}$ PC". A second and third purging cycle are carried out in similar fashion, during which, each respective starting pressure is set at 110000 absolute Pa and each respective intermediate vacuum is set at 1000 absolute Pa. After each purging cycle when the cold box has already been filled with $CO_2$ of respective purity to 110000 absolute Pa, the V % of $CO_2$ and remaining impurity in the cold box are calculated, and again listed in the column of Table 1 labeled as "after $2^{nd}$ PC" and "after $3^{rd}$ PC" respectively. The cold box is then evacuated to reach the pre-determined primary vacuum of 100 absolute Pa. The cold box is then sealed to form a vacuum-tight enclosure. The final vacuum in the cold box is calculated and listed in the column of Table 1 labeled as "Final vacuum (Pa)" assuming the temperature within the cold box is decreased to −170° C.

TABLE 1

Effect of $CO_2$ purity on final vacuum at −170° C. (starting pressure 110000 Pa, intermediate vacuum 1000 Pa, primary vacuum 100 Pa)

| $CO_2$ purity (V %) | Final Vacuum (Pa) | $CO_2$/impurity in the insulation enclosure (V %) | | | |
|---|---|---|---|---|---|
| | | At Start | After 1st PC | After 2nd PC | After 3rd PC |
| 99.995 | 0.461 | 9.090/90.910 | 99.169/0.831 | 99.987/0.013 | 99.995/0.005 |
| 99.99 | 0.915 | 9.090/90.910 | 99.164/0.836 | 99.982/0.018 | 99.990/0.010 |
| 99.9 | 9.097 | 9.082/90.918 | 99.074/0.926 | 99.892/0.108 | 99.900/0.100 |
| 99 | 90.915 | 9.000/91.000 | 98.182/1.818 | 98.993/1.007 | 99.000/1.000 |

Table 1 illustrates that for a final pressure lower than 1 absolute Pa at around −170° C., the purity of $CO_2$ needs to be higher than 99.99 V %, and the higher the purity, the lower the final pressure obtained within the cold box.

Secondly, the effect of intermediate vacuum on the final vacuum is explored. Four hypothetical experiments are conducted following similar process as described in detail above. For all four experiments, three purging cycles are performed, and the filling gas employed is $CO_2$ with a purity of 99.995 V %, the starting pressure is always 110000 Pa and the primary vacuum is 100 absolute Pa. In each of the experiment, the intermediate vacuum is kept the same for all three purging cycles. When the intermediate vacuum is 10000 Pa, the final vacuum achievable is 6.663 Pa. When the intermediate vacuum is 1000 Pa, the final vacuum achievable is 0.461 Pa. When the intermediate vacuum is 100 Pa, the final vacuum achievable is 0.455 Pa, not a significant improvement over the previous experiment. The final vacuum obtained is also 0.455 absolute Pa when the intermediate vacuum is 10 Pa. The above calculated data are listed in Table 2.

TABLE 2

Effect of intermediate vacuum on final vacuum at −170° C. ($CO_2$ purity 99.995 V %, starting pressure 110000 Pa, primary vacuum 100 Pa)

| Intermediate Vacuum (Pa) | Final Vacuum (Pa) | $CO_2$/impurity in the insulation enclosure (V %) | | | |
|---|---|---|---|---|---|
| | | At Start | After 1st PC | After 2nd PC | After 3rd PC |
| 10000 | 6.663 | 9.090/90.910 | 91.731/8.269 | 99.244/0.756 | 99.927/0.073 |
| 1000 | 0.461 | 9.090/90.910 | 99.169/0.831 | 99.987/0.013 | 99.995/0.005 |
| 100 | 0.455 | 9.090/90.910 | 99.912/0.088 | 99.995/0.005 | 99.995/0.005 |
| 10 | 0.455 | 9.090/90.910 | 99.987/0.013 | 99.995/0.005 | 99.995/0.005 |

Table 2 illustrates that to achieve adequate final vacuum, it is not necessary to choose a very hard intermediate vacuum during each purging cycle. In fact, an intermediate vacuum around 1000 Pa is sufficient.

Thirdly, the effect of primary vacuum on the final vacuum is explored. Three experiments are designed following similar process as described in detail above. For all three experiments, three purging cycles are performed, and the filling gas employed is $CO_2$ with a purity of 99.995 V %, the starting pressure is always 110000 Pa and the intermediate vacuum is 1000 absolute Pa. In each of the experiment, the primary vacuum referred to the vacuum level created at ambient temperature right before the insulation enclosure is sealed. When the primary vacuum is 1000 Pa, the final vacuum achievable is 4.608 Pa. When the primary vacuum is 100 Pa, the final vacuum achievable is 0.461 Pa. When the primary vacuum is 10 Pa, the final vacuum obtainable is 0.046 absolute Pa. The above experimental data are listed in Table 3

TABLE 3

Effect of primary vacuum on final vacuum at −170° C. ($CO_2$ purity 99.995 V %, starting pressure 110000 Pa, intermediate vacuum 1000 Pa)

| Primary Vacuum (Pa) | Final Vacuum (Pa) | $CO_2$/impurity in the insulation enclosure (V %) | | | |
|---|---|---|---|---|---|
| | | At Start | After 1st PC | After 2nd PC | After 3rd PC |
| 1000 | 4.608 | 9.090/90.910 | 99.169/0.831 | 99.987/0.013 | 99.995/0.005 |
| 100 | 0.461 | 9.090/90.910 | 99.169/0.831 | 99.987/0.013 | 99.995/0.005 |
| 10 | 0.046 | 9.090/90.910 | 99.169/0.831 | 99.987/0.013 | 99.995/0.005 |

Table 3 illustrates that the final pressure in the cold box at around −170° C. drops along with the decrease of primary vacuum in the cold box at ambient temperature. Nevertheless, a primary vacuum of 100 Pa is sufficient.

Taking into account of the impact of the three variables, purity of filling gas, intermediate vacuum and primary vacuum, on the final vacuum achievable at cryogenic temperature, it is recommended to choose a filling gas, $CO_2$ for example, with a purity equal or above 99.99 V %, an intermediate vacuum of around 1000 absolute Pa and a primary vacuum of around 100 absolute Pa. Under these conditions, following the process described in detail in the present disclosure, a theoretical vacuum of lower than 1 absolute Pa can be established at cryogenic temperature (around −170° C.) automatically.

Although this invention has been described in detail with reference to certain embodiments, those skilled in the art will recognize that variations and modifications of the described embodiments may be used. Accordingly, these variations and modifications are also within the spirit and scope of the invention as defined by the appended claims and their equivalents.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for establishing an insulation enclosure, the process comprising the steps of:
   a) providing the insulation enclosure having a casing encompassing a cryogenic equipment, wherein the cryogenic equipment comprises a rectification column used in cryogenic air separation to produce oxygen, nitrogen, argon or other pure components of air;
   b) providing a filling gas of a desired purity to the insulation enclosure;
   c) performing a first purging cycle to the insulation enclosure by evacuating the insulation enclosure from a first starting pressure to a first intermediate vacuum, followed by re-pressuring the insulation enclosure with the filling gas to a second starting pressure;
   d) creating and maintaining a primary vacuum in the insulation enclosure filled primarily with the filling gas; and
   e) operating the cryogenic equipment to cool the insulation enclosure and the filling gas to a temperature sufficiently low to solidify the filling gas, thus creating a final vacuum in the insulation enclosure;
   wherein starting from the primary vacuum, the filling gas undergoes transformation from gas phase to solid phase directly during cooling caused by the operation of the cryogenic equipment,
   wherein at least a portion of the filling gas comes in direct contact with the rectification column during step e),
   wherein the process further comprises an absence of adding an insulating material to the inside of the insulation enclosure.

2. The process of claim 1, wherein the insulation enclosure is a cold box or a cylindrical enclosure.

3. The process of claim 1, wherein the filling gas is carbon dioxide.

4. The process of claim 3, wherein the purity of carbon dioxide is equal to or better than 99.99% volume percentage.

5. The process of claim 1, wherein the cryogenic equipment comprises the rectification apparatus used in the cryogenic separation or storage apparatus for cryogenic products.

6. The process of claim 1, wherein the first purging cycle is followed by a second purging cycle and a third purging cycle with the filling gas, wherein each purging cycle is characterized by its respective second and third starting pressure and second and third intermediate vacuum.

7. The process of claim 6, wherein the insulation enclosure is pressurized with the filling gas to a fourth starting pressure after the third purging cycle and the primary vacuum is created by evacuating the insulation enclosure therefrom.

8. The process of claim 6, wherein any starting pressure of one of the purging cycles is about atmospheric pressure.

9. The process of claim 6, wherein any starting pressure of one of the purging cycles is above atmospheric pressure.

10. The process of claim 1, wherein before the first purging cycle, the insulation enclosure is pressurized with the filling gas to the first starting pressure.

11. The process of claim 6, wherein any starting pressure and the intermediate vacuum of each purging cycle are the same.

12. The process of claim 11, wherein the intermediate vacuum of each purging cycle is about 1000 absolute Pascal.

13. The process of claim 11, wherein the primary vacuum is about 100 absolute Pascal.

14. The process of claim 1, wherein the cryogenic equipment is operated at a temperature below −150° C.

15. The process of claim 1, wherein the final vacuum in the insulation enclosure is below 1 absolute Pascal.

16. The process of claim 1, wherein the insulation enclosure does not contain any insulation materials including perlite or aerogel.

17. The process of claim 1, wherein a thermal radiation shield is disposed inside the insulation enclosure.

18. The process of claim 17, wherein the thermal radiation shield comprises radiation shielding sheets and radiation shielding coating.

19. The process of claim 18, wherein the radiation shielding sheets are made of copper or aluminum.

20. The process of claim 19, wherein the radiation shielding sheet is covering the inner surface of the casing encompassing the cryogenic equipment.

21. The process of claim 17, wherein the radiation shielding coating is disposed on the inner surface of the casing.

22. An insulation enclosure for a cryogenic equipment, comprising:
   a) a casing encompassing the cryogenic equipment and the insulation enclosure being filled mostly with a filling gas of a desired purity;
   b) said insulation enclosure being evacuated to and maintained at a primary vacuum;
   c) a final vacuum being achieved in the insulation enclosure after the filling gas is solidified during the cooling caused by the operation of the cryogenic equipment; and
   wherein starting from the primary vacuum, the filling gas undergoes transformation from gas phase to solid phase directly during the cooling of the insulation enclosure caused by the operation of the cryogenic equipment wherein the insulation enclosure comprises an absence of adding an insulating material to the inside of the insulation enclosure.

23. The insulation enclosure of claim 22, wherein the insulation enclosure comprises an absence of any insulation materials including perlite or aerogel.

24. The insulation enclosure of claim 22, wherein the filling gas comprises carbon dioxide.

25. The insulation enclosure of claim 24, wherein the purity of carbon dioxide is equal to or better than 99.99% volume percentage.

26. The insulation enclosure of claim 22, wherein the cryogenic equipment comprises rectification apparatus used in cryogenic separation or storage apparatus for cryogenic products.

27. The insulation enclosure of claim 26, wherein the cryogenic equipment is operated at a temperature below −150° C.

28. The insulation enclosure of claim 22, wherein the primary vacuum is about 100 absolute Pascal.

29. The insulation enclosure of claim 22, wherein the casing has connection ports for evacuating and pressurizing the insulation enclosure.

30. The insulation enclosure of claim 22, wherein a thermal radiation shield is disposed inside the insulation enclosure.

31. The insulation enclosure of claim 30, wherein the thermal radiation shield comprises radiation shielding sheets and radiation shielding coating.

32. The insulation enclosure of claim 31, wherein the radiation shielding sheets are made of copper or aluminum.

33. The insulation enclosure of claim 31, wherein the radiation shielding coating is covering the inner surface of the casing encompassing the cryogenic equipment.

34. The insulation enclosure of claim 30, wherein the radiation shielding coating is disposed on the inner surface of the casing.

* * * * *